United States Patent Office 3,578,692
Patented May 11, 1971

---

3,578,692
1,3-DISILYL-1,3,2,4-DIAZADISILETIDINES AND PROCESS
Walter Fink, Zurich, Switzerland, assignor to Monsanto Company, St. Louis, Mo.
No Drawing. Filed Nov. 25, 1968, Ser. No. 778,841
Int. Cl. C07f 7/02
U.S. Cl. 260—448.2       11 Claims

ABSTRACT OF THE DISCLOSURE

The invention is a process for preparing 1,3-bis-disilyl-1,3,2,4-diazadisiletidines of the formula

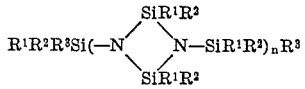

where $n$ is 1 to 100, by reacting a compound of the formula

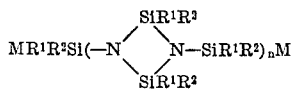

where M is a metal atom linked through an oxygen atom, with a compound of the formula $XR^3$ where X is a reactive halogen atom, and new compounds of the first formula above where $n$ is an integer of 1 to 100.

The compounds prepared in this manner find utility as temperature resistant products.

---

Co-pending patent application Ser. No. 724,585, filed Apr. 26, 1968, and now abandoned, relates to a process for preparing 1,3-disilyl-1,3,2,4-diazadisiletidines of the formula (I)

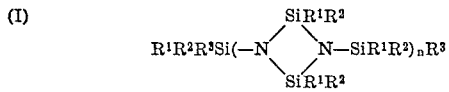

in which $R^1$, $R^2$ and $R^3$, taken singly, signify identical or different, possibly substituted and/or ethylenically or acetylenically unsaturated hydrocarbon groups, heterocyclic groups or silyl groups, which also can be attached through an oxygen atom, and the silyl groups moreover can also be attached through a nitrogen atom; $R^1$ and $R^2$ signify moreover also hydrogen atoms or fluorine atoms; $R^1$ and $R^2$, taken together with their silicon atom, signify a possibly substituted heterocyclic group; and $n$ signifies an integer of 1 to 100.

The compounds (I) are obtained by reacting a 1,3-disilyl-1,3,2,4-diazadisiletidine of the formula (II)

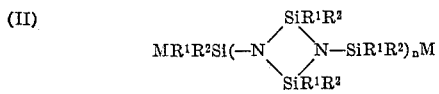

in which $R^1$, $R^2$ and $n$ are defined as above and M signifies a reactive halogen atom, an $H_2N$ group, a secondary or tertiary amino group deriving from an amine which is more volatile than the hydroxyl compound or aminosilane compound to be reacted in the amine exchange process, with a compound of the formula (III)    $XR^3$ in which $R^3$ is defined as above and X represents in the halogen exchange process an alkali metal atom, or in the amine exchange process a hydrogen atom linked through an oxygen atom or nitrogen atom, and the reaction is conducted, possibly in an inert solvent, until no more essential quantity of alkali halide or ammonia or amine is formed.

Now it has been found that these compounds are also obtained by reacting a metal derivative of a 1,3-bis-(hydroxysilyl)-1,3,2,4-diazadisiletidine having the general Formula II shown above, wherein $R^1$, $R^2$ and $n$ possess the same significance as above and M represents a metal atom linked through an oxygen atom, especially an alkali metal atom linked through an oxygen atom, with a compound having the general Formula III shown above, wherein $R^3$ has the same significance, except that it cannot be attached through an oxygen atom, and X signifies a reactive halogen atom, especially a chlorine atom, in an inert solvent until no more substantial amount of metal halide is formed.

Now, also compounds in which $R^3$ signifies a silyl group can more easily be prepared in comparison with the process described in the co-pending application, since the silanols necessary in the previously described process for the introduction of a silyl group tend, as is well known, to easily self-condense, while the corresponding halogen derivatives are stable starting compounds and facilitate reaction.

The process of invention occurs with, for example, the sodium derivative of a 1,3-bis-(hydroxysilyl)-1,3,2,4-diazadisiletidine and a chlorodisiloxane according to the following equation:

(a)

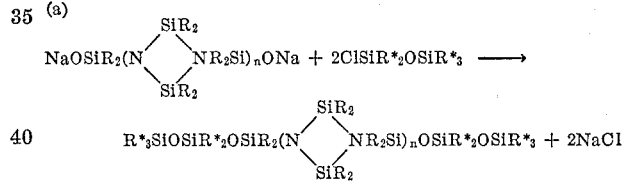

With respect to the end product (I) formulated at the beginning, $R^3$ signifies in this case a silyl group attached through an oxygen atom, namely a disiloxane group attached through an oxygen atom, whereas R and R* have the significance of $R^1$ and $R^2$.

Numerous silyl groups, which can be reacted in the form of their halogen derivatives, have been enumerated above.

The process has the further advantage that halosilanes showing two or more reactive halogen atoms can be reacted. Dimethyldihydroxysilane, methyltrihydroxysilane, tetrahydroxysilane and similar compounds, for example, displaying great tendency to self-condensation, cannot be reacted, while the corresponding halosilanes are available starting compounds.

The silyl groups can contain more than one silicon atom and it will be clear to those skilled in the art that also more than one silicon atom can bear reactive halogen atoms. Such silyl groups have Si—Si, Si—C—Si and Si—O—Si groupings.

These halogen compounds are well known from the technical literature. Examples are 1,2-dichlorotetramethyldisilane,
1,2-dichlorotetraphenyldisilane,
bis-(dimethylchlorosilyl)-methane,
1,3-bis-(methylhydrogenochlorosilyl)-benzene,
1,2-dichlorotetramethyldisiloxane,
1,2-dimethyltetrachlorodisiloxane,
hexachlorodisiloxane,
1,2-dichlorotetramethyldisilane,
1,2-dimethyltetrachlorodisilane,
hexachlorodisilane,
bis-(hydrogenodichlorosilyl)-methane,
trichlorosilyl-hydrogenodichlorosilylmethane,
bis-(trichlorosilyl)-methane,
1-trichlorosilyl-2-dichlorohydrogenosilylethane,
1-trichlorosilyl-1-hydrogenodichlorosilylethane,
1-methyldichlorosilyl-3-hydrogenodichlorosilylpropane,
1-ethyldichlorosilyl-3-hydrogenodichlorosilylpropane,
hexyldichlorosilyl-hydrogenodichlorosilylmethane,
bis-(methylhydrogenochloro)-disiloxane and
1-dimethylchloro-2-methylchlorohydrogenodisiloxane.

Some well known examples of unsaturated halosilanes having two silicon atoms are tetrakis-(trichlorosilyl)-ethene, 1,2-bis-(trichlorosilyl)-ethene and bis-(methylchlorosilyl)-acetylene.

Various end products are obtained according to the stoichiometric ratio employed, if also the second reactant is difunctional. In general, the reaction is carried out so that the metal atoms will be completely replaced, since especially the alkali salts are unstable. This reaction can be illustrated with, for example, a sodium derivative of a 1,3-bis-(hydroxysilyl)-1,3,2,4-diazadisiletidine and a dichlorosilane as follows:

(b)

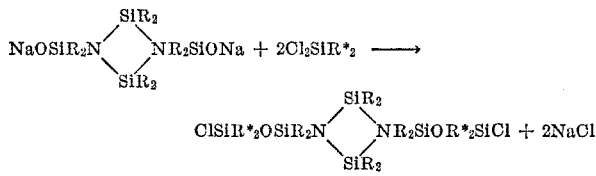

The sodium derivative is expediently reacted with excess dichlorosilane in order to make the reaction proceed in the desired manner shown above. The compounds of invention in this case still contain reactive halogen atoms replaceable for other groups in known manner. It is advantageous for this purpose to use the opposite reaction described previously.

The expert will recognize that it will be possible to make end products consisting of regularly recurring cyclodisilazane units and siloxane units. This reaction may be illustrated as follows:

(c)

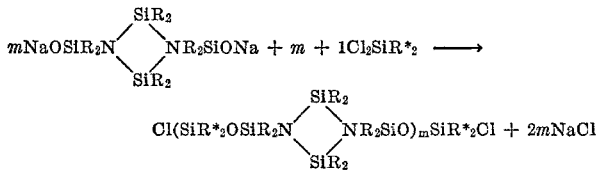

In this formula R has the significance of $R^1$ and $R^2$, $R^*$ has the same significance as before and $m$ represents an integer. With respect to the end product (I) formulated at the beginning, in this case and if $m$ is 2 or greater, $R^3$ signifies a silyl group linked through an oxygen atom. The term "silyl group" in this case is understood in the largest sense and signifies a recurring cyclodisilazanyldisiloxanyl group.

Those skilled in the art will recognize that with increasing number $m$ the reactants are approaching an equimolar proportion, whereby products are formed having numerous repeating units as usual in polymeric products. In general, chain termination easily occurs in this kind of reaction, so that $m$ will be in the range of about 1 to 200.

It is understood that with increasing chain the significance of the terminal reactive halogen atoms diminish more and more. Nevertheless it is expedient to replace these remaining halogen atoms with inert groups in order to reach useful temperature resistant end products. This replacement of the remaining halogen atoms as already mentioned above can be achieved in well known manner.

In the Equations (b) and (c) the starting compounds also can contain $n$ ring units attached together as is shown in Equation (a), in general, if $m$ is greater than 3, it is preferred however to keep $n$ as small as possible and preferably equal to 1 and thus to regularly arrange in a series cyclodisilazane units and siloxane units. However, longer siloxane chains will be introduced if liquid end products are desired.

On using, for example, a trichlorosilane or tetrachlorosilane, there can be obtained according to the scheme (b) and the indicated procedure, end products of the formulae

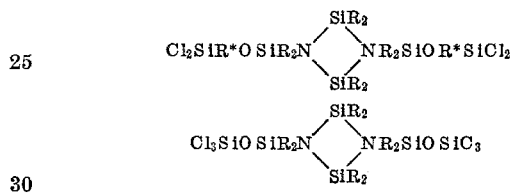

having up to six reactive halogen atoms.

Accordingly there can be obtained cross-linked end products according to the scheme (c) which can be expressed by, for example, the formulae

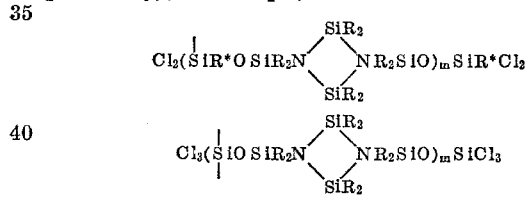

The first reactants cited in the Equations (a) to (c) are metal derivatives of 1,3-bis-(hydroxysilyl)-1,3,2,4-diazadisiletidines. The same organic groups should be considered for $R^1$ and $R^2$ as have been enumerated and explained above. Some of the groups $R^1$ and $R^2$ may also be hydrogen atoms, fluorine atoms or silyl groups, since the precursor compounds used in the preparation of the reactants are halosilanes. It will be clear to those skilled in the art that the groups $R^1$ and $R^2$ will not be exclusively hydrogen atoms, fluorine atoms or silyl groups, but will occur in the same compound simultaneously together with organic groups, either in the same silyl group or in another silyl group of this same compound. Thus, the term "some" is to be so understood.

The preparation of 1,3-bis-(hydroxysilyl)-1,3,2,4-diazadisiletidines is achieved using the corresponding halogen derivatives, especially chlorine derivatives, according to the equation:

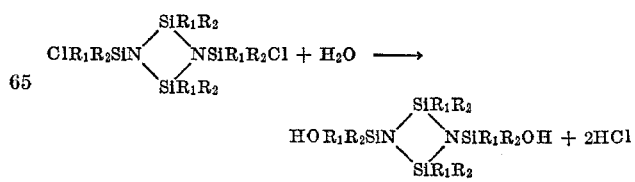

This conversion should be carried out in presence of an acid-binding agent, so that the reaction milieu does not contain free acid. Suitable acid-binding agents are, for example, tertiary amines like trimethyl amine, triethyl amine and so on. The halide must be added to the alkaline or basic aqueous solution. Alkali salts are preferred in the additional reactions of Equations (a), (b) or (c). These can be prepared in known manner by reacting a hydroxyl compound with, e.g. butyl lithium, sodium hydride or potassium hydride.

The reaction of invention proceeds at room temperature. The reaction mixture is expediently heated subsequently at a higher temperature for some time, until the separation of the alkali halide is complete. The reaction can be carried out with or without a solvent. The presence of an inert solvent, e.g. hexane, is favorable for the removal of the byproduct alkali salts. It is advantageous to work with exclusion of moisture in order to avoid hydrolysis of the reactive halogen atoms.

EXAMPLE 1

30.6 g. (0.1 mole) of 1,3-bis-(dimethyl-lithiumoxysilyl)-2,2,4,4-tetramethyl-1,3,2,4-diazadisiletidine and excess dimethyldichlorosilane (100 g.) are stirred at room temperature for 5 hours and subsequently at 50° C. for 3 hours. Excess dimethyldichlorosilane is distilled off in the vacuum. Hexane and charcoal are added to the pulpy residue and the lithium chloride is filtered off using CELLIT. The solvent is distilled off and the residue fractionally distilled. Yield 43.2 g. (90%) of 1,3-bis(3-chlorotetramethyldisiloxanyl)-2,2,4,4-tetramethyl - 1,3,2,4-diazadisiletidine; B.P. 82° C./0.001 mm. $n_D^{20}$ 1.4355.

Calc'd for $C_{12}H_{36}O_2N_2Cl_2Si_6$ (479.89) percent: C, 30.03; H, 7.56; N, 5.84; Cl, 14.78. Found, percent: C, 29.93; H, 7.77; N, 5.60; Cl, 14.38.

In the preparation of the starting compound, 20 g. (0.06 mole) of 1,3-bis-(dimethylchlorosilyl)-2,2,4,4-tetramethyl-1,3,2,4-diazadisiletidine, dissolved in 20 ml. of hexane, are added dropwise to a mixture of 300 ml. of triethyl amine and 90 ml. of water. It is important that the chloride is added by drops to the amine-water mixture and not the reverse, since otherwise products having another structure will be obtained. After stirring for 15 minutes the mixture is shaken three times with water and the amine and the solvent are distilled off at 30–50° C. in the vacuum. The crystalline residue is practically pure according to the NMR spectrum. Yield 17.58 (98.9%); M.P. 125° C. (from cyclohexane).

Calc'd for $C_8H_2O_2N_2Si_4$, percent: C, 32.61; H, 8.89; N, 9.51; mol wt. 294.7. Found, percent: C, 33.07; H, 8.59; N, 9.67; mol. wt. 289.

The dilithium derivative of this compound is obtained by reacting the silanol with twice a molar quantity of butyl lithium. To 45.0 g. (0.273 mole) of silanol, dissolved in 200 ml. of hexane and 250 ml. of triethyl amine (acting as a solvent intermediate), there are added by drops 200 ml. of 1.53 normal solution of butyl lithium with stirring. The solvent is removed under vacuum and the residue dried at 40° C. Yield 47.1 g. (100%).

Calc'd for $C_8H_{24}O_2N_2Si_4Li_2$ (306.54) percent: C, 31.35; H, 7.89; N, 9.14. Found, percent: C, 31.06; H, 7.78; N, 9.24.

EXAMPLE 2

To a boiling solution of 15.57 g. (0.05 mole) of 1-trimethylsilyl-3-dimethylchlorosilyl - 2,2,4,4-tetramethyl-1,3,2,4-diazadisiletidine are added 6.02 g. (0.02 mole) of 1,3-bis-(dimethyl-lithiumoxysilyl)-2,2,4,4-tetramethyl-1,3,2,4-diazadisiletidine. After boiling for 5 minutes the mixture is cooled, hexane is added and the lithium chloride is filtered off. The filtrate is concentrated and fractionally distilled. Yield 11.4 g. (67.56%); B.P. 193–195° C./0.005 mm., $n_D$ 1.4485.

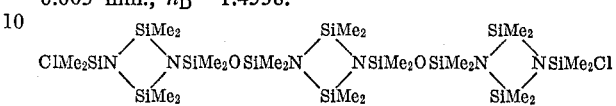

Calc'd for $C_{26}H_{78}O_2N_6Si_{12}$, percent: C, 37.00; H, 9.32; N, 9.96; mol. wt. 844.04. Found, percent: C, 37.13; H, 9.30; N, 9.82; mol. wt. 835.

EXAMPLE 3

To a boiling solution of 33.1 g. (0.11 mole) of 1,3-bis-(dimethylchlorosilyl)-2,2,4,4-tetramethyl - 1,3,2,4-diazadisiletidine are added 15.3 g. (0.05 mole) of 1,3-bis-(dimethyl-lithiumoxysilyl) - 2,2,4,4-tetramethyl - 1,3,2,4-diazadisiletidine. After boiling for 15 minutes the mixture is cooled, hexane and charcoal are added and the LiCl is filtered off. Yield 19.8 g. (44.4%); B.P. 207° C./ 0.005 mm., $n_D^{20}$ 1.4538.

Calc'd for $C_{24}H_{72}O_2N_6Si_{12}Cl_2$ (884.9) percent: C, 32.58; H, 8.20; N, 9.50; Cl, 8.01. Found, percent: C, 32.76; H, 8.30; N, 9.12; Cl, 7.70.

Also there are obtained 11.3 g. of the corresponding compound having 5 rings instead of 3 rings as shown above; B.P. 280° C./0.005 mm., $n_D^{20}$ 1.4525.

Calc'd for $C_{40}H_{120}Cl_2N_{10}O_4Si_{20}$ (1438.2) percent: C, 33.41; H, 8.41; Cl, 4.93; N, 9.74. Found, percent: C, 33.54; H, 8.18; Cl, 4.90; N, 9.54.

Example 4

15.9 g. (0.033 mole) of the chloro product of Example 1 and 4.6 g. (0.015 mole) of 1,3-bis(dimethyl-lithiumoxysilyl)-2,2,4,4-tetramethyl-1,3,2,4-diazadisiletidine are combined and refluxed for a short time. After addition of hexane and charcoal, the LiCl is separated. The filtrate is concentrated and fractionally distilled. Yield 14.3 g. (80.7%); B.P. 198–201° C./0.001 mm., $n_D^{20}$ 1.4415.

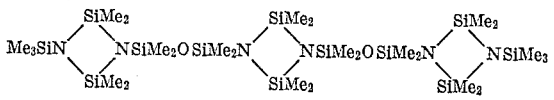

(Me=CH$_3$: $p=2$).

Calc'd for $C_{32}H_{96}O_6N_6Si_{16}Cl_2$ (1181.5) percent: C, 32.53; H, 8.19; N, 7.11; Cl, 6.01. Found, percent: C, 32.76; H, 8.27; N, 7.04; Cl, 6.14.

Also there are obtained 3.8 g. of the compound according to the formula above where $p=4$; B.P. 291–305° C./ 0.001 mm., $n_D^{20}$ 1.4404.

It is an oily viscous product.

Calc'd for $C_{52}H_{156}O_{10}N_{10}Si_{26}Cl_2$ (1883.2) percent: C, 33.17; H, 8.35; N, 7.44; Cl, 3.77. Found, percent: C, 33.41; H, 8.21; N, 7.52; Cl, 3.51.

Example 5

12.0 g. (0.039 mole) of 1,3-bis-(dimethyl-lithiumoxysilyl)-2,2,4,4-tetramethyl-1,3,2,4-diazadisiletidine and 7.9 g. (0.039 mole) of 1,3-dichlorotetramethyldisiloxane and 5 ml. of CCl$_4$ (solvent intermediate) are heated for 5 hours. Then, hexane and charcoal are added and the LiCl is filtered off using CELLIT. A viscous oil having a slight yellowish color remains after distillation of the solvent. On heating this oil in the high vacuum of 0.001 mm. at a bath temperature of 450 to 500° C., there can be distilled off 0.2 g. of a volatile substance, without the polymeric compound being altered otherwise.

The determination of the chlorine in the product indicated .2 to 0.3% by weight chlorine. The product has the following repeating structure:

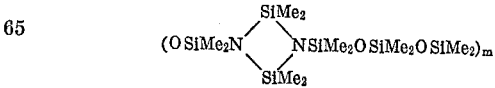

(Me=CH$_3$).

Calc'd for $C_{12}H_{36}O_3N_2Si_6$ (425 per unit shown in brackets) percent: C, 33.02; H, 8.54; N, 6.59. Found, percent: C, 34.04; H, 8.35; N, 6.68.

Example 6

One proceeds as in Example 1, however 1-chloro-3,3-diphenyltrimethyldisiloxane is used instead of dimethyldichlorosilane. Yield 68%, B.P. 230° C./0.005 mm., $n_D^{20}$ 1.5091, M.P. 26° C.

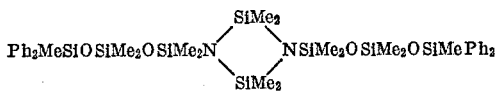

Calc'd for $C_{38}H_{62}O_4N_2Si_8$ (835.65) percent: C, 54.62; H, 7.48; N, 3.35. Found, percent: C, 54.62; H, 7.33; N, 2.97.

Example 7

19.5 g. (0.07 mole) of 1,3-bis(dimethyl-lithiumoxysilyl)-2,2,4,4-tetramethyl-1,3,2,4-diazadisiletidine are reacted with a large excess (80 g.) of 1,3-dichlorotetramethyldisiloxane. One proceeds as in Example 1. Yield 26.3 g. (60%); B.P. 104° C./0.005 mm., $n_D^{20}$ 1.4281.

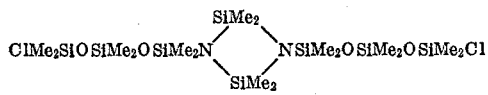

Calc'd for $C_{16}H_{48}O_4N_2Si_8Cl_2$ (628.2) percent: C, 30.59; H, 7.70; N, 4.48; Cl, 11.29. Found, percent: C, 30.77; H, 7.76; N, 4.31; Cl, 11.50.

Example 8

9.2 g. (0.03 mole) of 1,3-bis-(dimethyl-lithiumoxysilyl)-2,2,4,4-tetramethyl-1,3,2,4-diazadisiletidine are reacted with 39 g. (0.1 mole) of 1,5-dichlorohexamethyltrisiloxane. One proceeds as in Example 1. Yield 8.6 g. (37%); 146° C./0.005 mm., $n_D^{20}$ 1.4235.

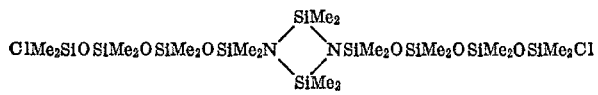

Calc'd for $C_{20}H_{60}N_2O_6Cl_2Si_{10}$ (776.5) percent: C, 30.94; H, 7.79; N, 3.61; Cl, 9.13. Found, percent: C, 30.13; H, 7.93; N, 3.46; Cl, 9.8.

Example 9

One proceeds as in Example 1, however 1-chloro-5,5-diphenylpentamethyltrisiloxane is used instead of dimethyldichlorosilane. Yield 9.8 g. 50%, B.P. 246° C./0.005 mm., M.P. 1-3° C. $n_D^{20}$ 1.4925, dec.p. 413° C.

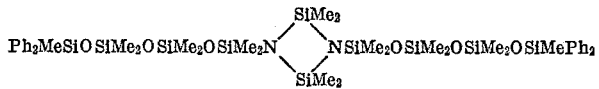

Calc'd for $C_{42}H_{74}N_2O_6Si_{10}$ (983.97) percent: C, 51.27; H, 7.58; N, 2.85. Found, percent: C, 51.43; H, 7.54; N, 2.97.

What I claim is:
1. A process for preparing 1,3-disilyl-1,3,2,4-diazadisiletidines of the general formula

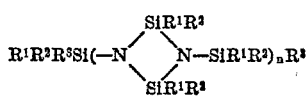

in which $R^1$ and $R^2$ represent lower alkyl groups or phenyl groups, $R^3$ represents silyl or siloxy groups and halogenated derivatives thereof and $n$ represents an integer, which comprises contacting a compound of the general formula

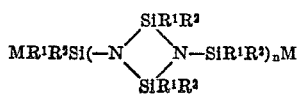

where M represents an alkali metal atom linked through an oxygen atom with a compound having the general formula $$XR^3$$

where X represents a reactive halogen atom.

2. The process of claim 1 wherein said reactive halogen atom is chlorine or bromine.
3. The process of claim 1 wherein $R^3$ represents a siloxy group.
4. A product of the formula

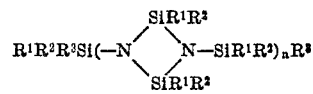

in which $R^1$ and $R^2$ represent lower alkyl groups or phenyl groups, $R^3$ represents silyl or siloxy groups and halogenated derivatives thereof and $n$ represents an integer.

5. A product of claim 4 represented by the formula

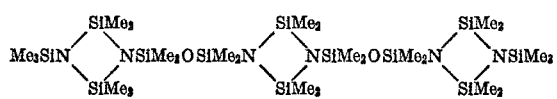

wherein Me represents a methyl group.

6. A product of claim 4 represented by the formula

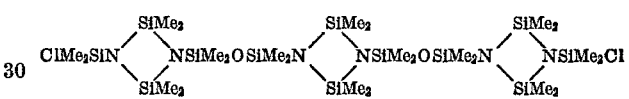

wherein Me represents a methyl group.

7. A product of claim 4 represented by the formula

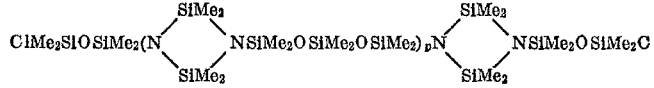

wherein Me represents a methyl group.

8. A product of claim 4 represented by the formula

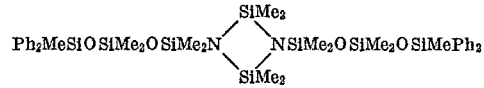

wherein Me represents a methyl group and Ph represents a phenyl group.

9. A product of claim 4 represented by the formula

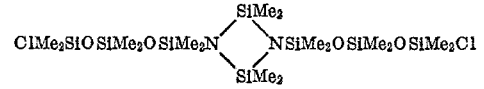

where Me represents a methyl group.

10. A product of claim 4 represented by the formula

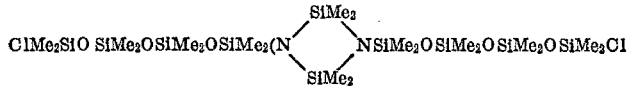

where Me represents a methyl group.

11. A product of claim 4 represented by the formula

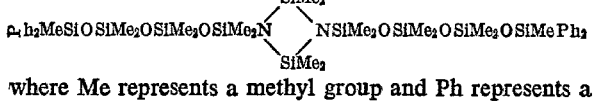

where Me represents a methyl group and Ph represents a phenyl group.

References Cited
UNITED STATES PATENTS

| | | | |
|---|---|---|---|
| 3,422,060 | 1/1969 | Fink | 260—448.2X |
| 3,468,922 | 9/1969 | Fink | 260—448.2 |

TOBIAS E. LEVOW, Primary Examiner

W. F. W. BELLAMY, Assistant Examiner

U.S. Cl. X.R.

260—448.2E